US009524364B1

(12) United States Patent
Rossman et al.

(10) Patent No.: US 9,524,364 B1
(45) Date of Patent: Dec. 20, 2016

(54) METHOD AND SYSTEM FOR CREATING IMPROVED ROUTING POLYGON ABSTRACTS

(71) Applicant: Cadence Design Systems, Inc., San Jose, CA (US)

(72) Inventors: Mark Edward Rossman, Bellevue, WA (US); Sabra Alexis Wieditz Rossman, Bellevue, WA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/494,545

(22) Filed: Sep. 23, 2014

(51) Int. Cl.
*G06F 17/50* (2006.01)
*G06F 19/00* (2011.01)
*G06K 9/00* (2006.01)
*G06K 9/46* (2006.01)
*G06K 9/48* (2006.01)
*G06F 3/048* (2013.01)

(52) U.S. Cl.
CPC .......... *G06F 17/5077* (2013.01); *G06F 3/048* (2013.01); *G06F 17/5004* (2013.01); *G06F 17/5072* (2013.01); *G06F 17/5081* (2013.01); *G06F 19/00* (2013.01); *G06F 2217/02* (2013.01); *G06F 2217/04* (2013.01); *G06F 2217/12* (2013.01); *G06K 9/00* (2013.01); *G06K 9/46* (2013.01); *G06K 9/48* (2013.01)

(58) Field of Classification Search
CPC .............. G06F 17/5081; G06F 17/5004; G06F 17/5007; G06F 17/5072; G06F 2217/04; G06F 2217/02; G06F 2217/12; G06F 19/00; G06F 3/048; G06T 11/20; G06K 9/00; G06K 9/46; G06K 9/48; G06K 6/00

USPC ......... 716/54, 52, 55, 56, 112; 382/154.199, 382/203; 715/798
See application file for complete search history.

(56) References Cited

U.S. PATENT DOCUMENTS

| | | | | |
|---|---|---|---|---|
| 5,612,893 A | * | 3/1997 | Hao | G06F 17/5081 716/135 |
| 5,663,893 A | * | 9/1997 | Wampler | G03F 1/144 378/34 |
| 6,691,297 B1 | * | 2/2004 | Misaka | G06F 17/5068 430/30 |
| 8,994,960 B2 | * | 3/2015 | Shimahashi | H04N 1/58 347/41 |
| 2004/0064796 A1 | * | 4/2004 | Li | G06F 17/5081 716/112 |
| 2004/0170905 A1 | * | 9/2004 | Liebmann | G03F 1/36 430/5 |
| 2005/0172247 A1 | * | 8/2005 | Papadopoulou | G06F 17/5081 716/112 |
| 2008/0059916 A1 | * | 3/2008 | Chang | G06F 17/5068 716/120 |
| 2008/0229259 A1 | * | 9/2008 | Wang | G06F 17/5068 716/132 |

(Continued)

*Primary Examiner* — Phallaka Kik
(74) *Attorney, Agent, or Firm* — Vista IP Law Group, LLP

(57) ABSTRACT

Methods and systems for creating and implementing improved routing polygon abstracts that can be used to efficiently find areas to route through in electrical designs, where the routing polygon abstracts include at least a horizontal routing polygon abstract, a maximum horizontal routing polygon abstract, a vertical routing polygon abstract, and a maximum vertical routing polygon abstract, that are created through various steps including bloating, shrinking, merging, and extending the objects towards an outer boundary.

20 Claims, 19 Drawing Sheets

(56) References Cited

U.S. PATENT DOCUMENTS

| | | | | |
|---|---|---|---|---|
| 2009/0106715 A1* | 4/2009 | Pikus | ............... | G06F 17/5081 |
| | | | | 716/106 |
| 2010/0023902 A1* | 1/2010 | Moroz | ............... | G06F 17/5081 |
| | | | | 716/136 |
| 2014/0164984 A1* | 6/2014 | Farouki | ............... | G06F 3/0485 |
| | | | | 715/784 |
| 2014/0331191 A1* | 11/2014 | Wu | ............... | G03F 1/00 |
| | | | | 716/53 |
| 2016/0063166 A1* | 3/2016 | Hsieh | ............... | G06F 17/5072 |
| | | | | 257/774 |

* cited by examiner

METHOD AND SYSTEM FOR CREATING IMPROVED ROUTING POLYGON ABSTRACTS

BACKGROUND

An integrated circuit (IC) has a large number of electronic components, such as transistors, logic gates, diodes, and wires that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives, such as for example, transistors and diodes, their sizes and interconnections. An integrated circuit designer may use a set of layout EDA application programs to create a physical design of the IC from the logical design. The layout EDA application uses geometric shapes of different materials to create the various electrical components on an integrated circuit and to represent electronic and circuit IC components as geometric objects with varying shapes and sizes. The geometric information about the placement of the nodes and components onto the chip may be determined by a placement process and a routing process. The placement process is a process for placing electronic components or circuit blocks on the chip. The routing process is a process for creating interconnections between the blocks and components according to the specified netlist. After an integrated circuit designer has created an initial integrated circuit layout, the designer then verifies and optimizes the integrated circuit layout using a set of EDA testing and analysis tools. Verification may include, for example, design rule checking to verify compliance with rules established for various IC parameters.

Generally, the routing process is computationally intensive. A typical IC design may contain thousands of geometric objects representing electronic and circuit IC components that need to be interconnected while satisfying numerous constraints. For example, an object from one class may require a certain spacing from its nearest neighbor object so that the two do not interfere with each other. Further, object spacing rules arise due to the limitations inherent in the semiconductor manufacturing process. For example, when creating IC objects using a lithography manufacturing processes, objects can only be so small, so thin, or so close to one another before the physics of the substrate, mask, and incoming irradiating light start producing errors in design. Further complications arise due to the fact that some objects cannot share wires or buses with other objects and instead require dedicated routes to their destination. Finally, in many designs, it is preferable to optimize the routed designs so that individual objects are connected using the shortest route possible. This is in part due to the fact that wires routed along long paths tend to cause noise, power dissipation, and timing issues. The above factors compound to create a very complex problem for route tools to solve.

Conventional route tools approach this problem by modeling each geometric object as a crude data set. Every object has corresponding data, and the route tool must track many thousands of objects, each with their own constraints and parameters, in an effort to optimize routes. However, this approach is not only computationally intensive, it often yields inefficient overly complex designs that are produced at higher costs.

DESCRIPTION OF THE FIGURES

The drawings illustrate the design and utility of preferred embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a method, system, and computer program product for an operation which is or is to be operated upon an electronic design for the performance of a task on the electronic circuit. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Embodiments of the present invention provide improved systems and methods for creating horizontal, vertical, maximum horizontal, and maximum vertical routing polygon abstracts that can be used to more efficiently route electrical designs. Routing electrical designs is a computationally intensive process due to the large number of objects that must be tracked, connected, or otherwise routed throughout a design. As technology evolves and designs become more intricate, the addition of more objects increases complexity, processing costs, storage costs, and other costs associated with routing and electrical design.

To handle the increase in complexity, improved routing polygon abstracts are required. The systems and methods disclosed herein teach one of ordinary skill in the art how to implement improved routing polygon abstracts. For example, horizontal abstracts and maximum horizontal abstracts, as taught below, help one more efficiently process horizontal routing challenges and find open areas to route through. Similarly, vertical abstracts and maximum vertical abstracts, as taught below, help one more efficiently process vertical routing challenges and find open areas to route through.

Figure 1:
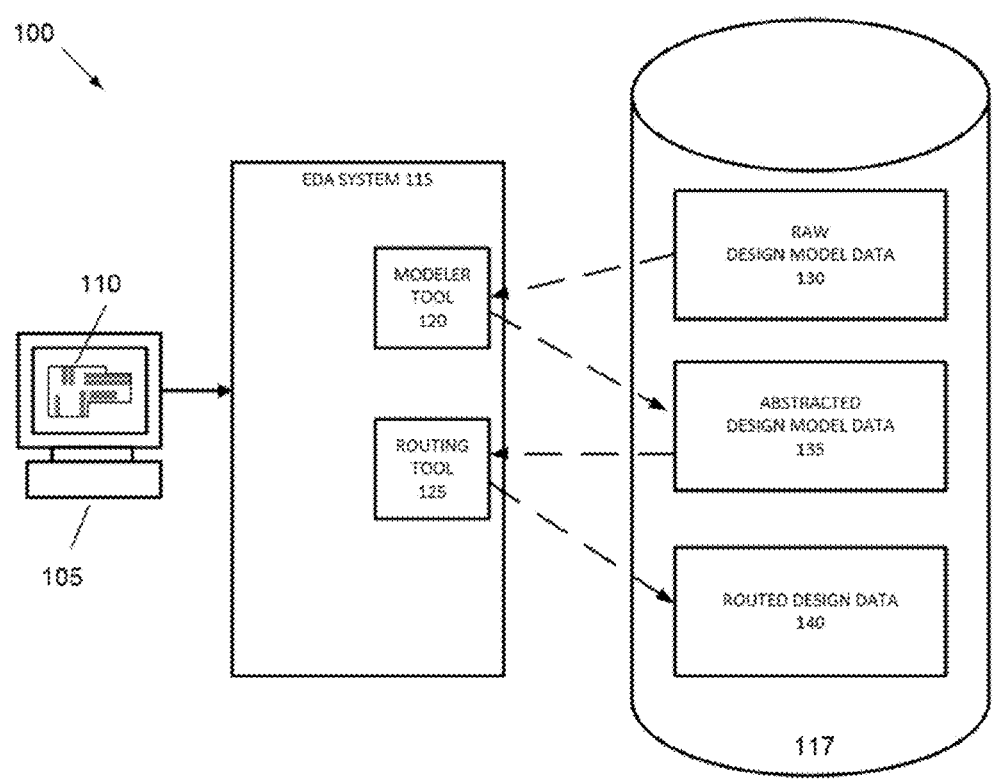
FIG. 1 illustrates a computing system for implementing a process for creating improved routing polygon abstracts.

With reference to FIG. 1, a version of a system for creating routing polygon abstracts 100 is shown comprising a computer system 105, aspects of an electronic design automation (EDA) system 115, and a plurality databases 117. Although the EDA system 115 is shown as comprising only two modules, one of ordinary skill in the art will appreciate that the EDA system may comprise many modules and components. In this version, EDA system 115 has a modeler tool 120 and a routing tool 125. EDA system is communicatively coupled to a plurality of databases 117, that may consist of data corresponding to raw design model data or physical design model data 130, manipulated design model data or abstracted model data 135, and routed design data 140, such as routing polygon abstracts. A user (not depicted) may use the computer system 105 and the EDA system 115 with the plurality of databases 117 to generate routing polygon abstracts, for example, as displayed on the screen of the computer system 110, or may alternatively not display them, but use them internally for further processes.

The raw design model data 130 may be data that corresponds to prototyping data, floor placement design data, partially routed design data, fully routed design data, routing optimization data, engineering change order (ECO) data, or data corresponding to physical electrical object design. Thus, as an input, the systems and methods disclosed herein may use completely unprocessed design data to create routing polygon abstracts, or may inherit partially completed or otherwise manipulated design data to create routing polygon abstracts.

The raw design model data 130 may be input into a modeler tool 120 so that it may be further manipulated either automatically or manually, for example, by the EDA system or a user of the computer system 105.

Figure 7A:
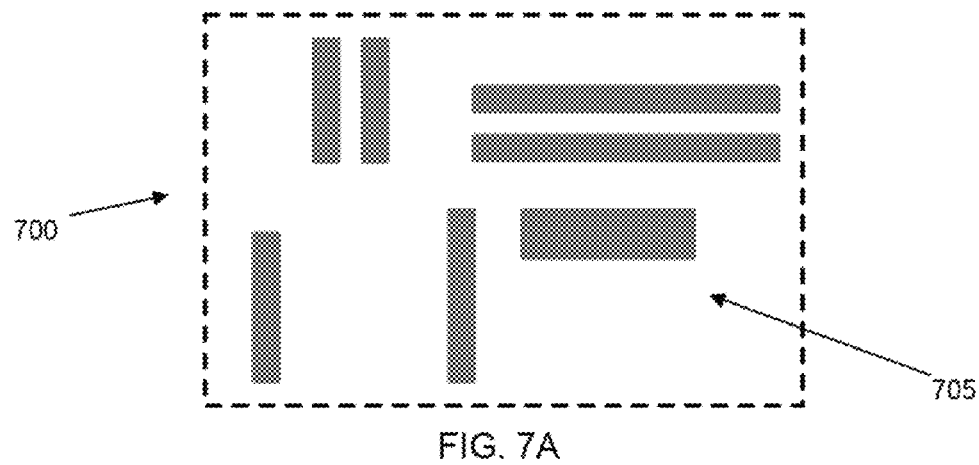
FIG. 7A-F illustrate example views of different stages of a method for creating horizontal routing polygon abstracts.

Output of the modeler tool may be stored in the databases 117 or held within the EDA system memory (not depicted) as manipulated design model data 135 for further processing. FIG. 7A, shows one possible example of manipulated design model data 135 comprising a level 700, and objects 705 within the level. The objects 705 are generally objects that must be incorporated into a electrical design by the EDA system, such as, for example, circuit components, wires, interconnects, fills, dummy fills, components, and blockages. The level 700 may correspond to a design floor or plane, such as a substrate, in which objects may be placed to create electrical designs.

Regarding FIG. 1, after manipulation by the modeler tool 120, the manipulated design model data 135 may be sent to the routing tool 125 for further processing. The routing tool's system and methods are explained in further detail below, but generally the tool is used to analyze received manipulated design model data 135 and create routed design data 140, such as routing polygon abstracts.

Figure 7B:
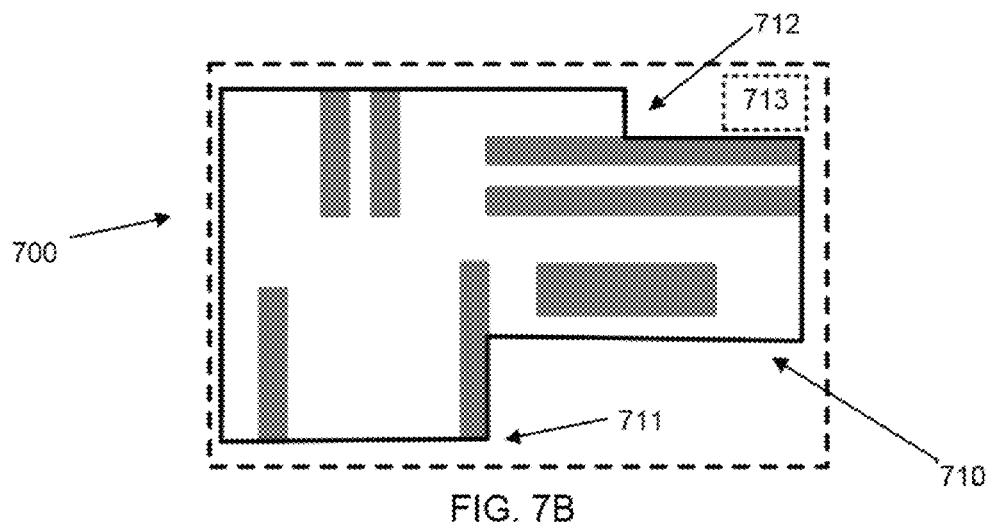
Figure 7C:
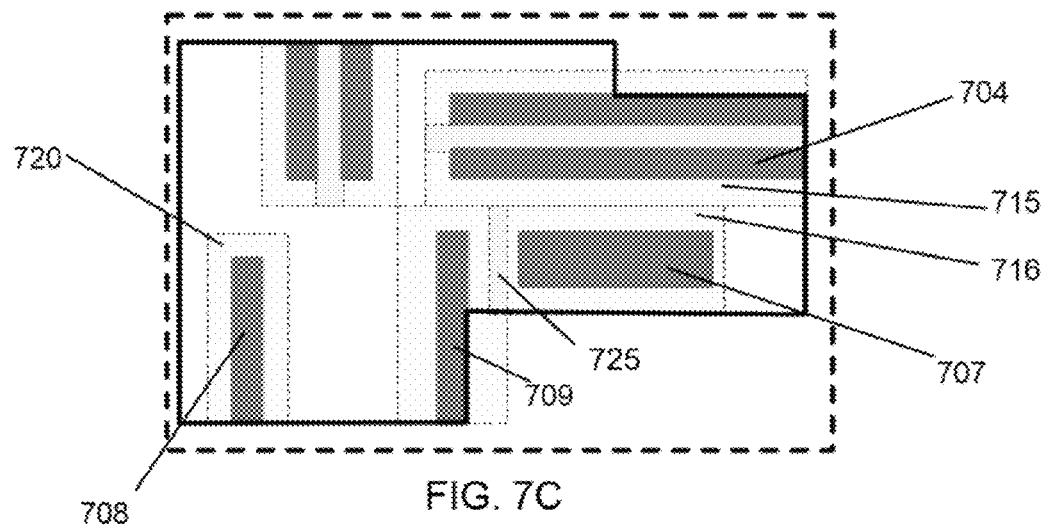
Figure 7D:
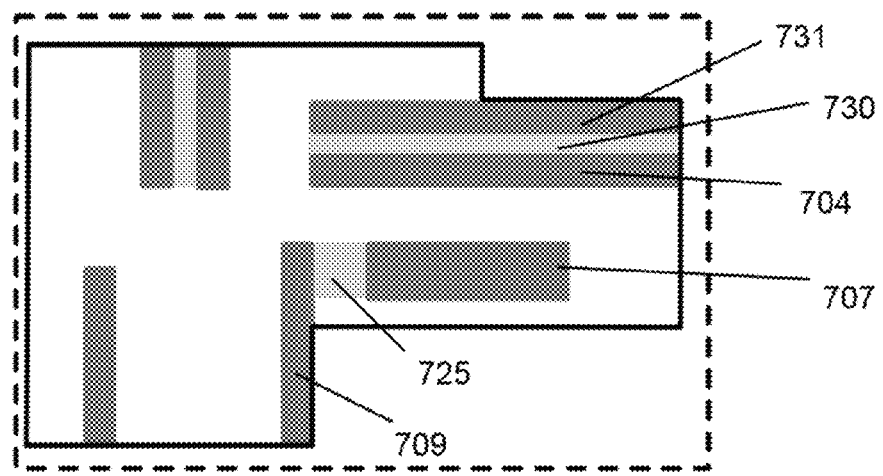
Figure 7E:
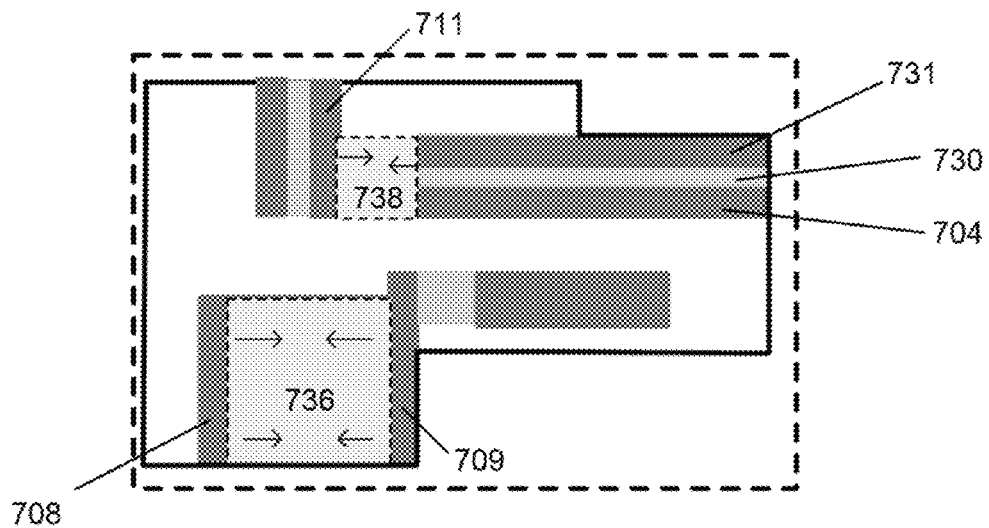
Figure 7F:
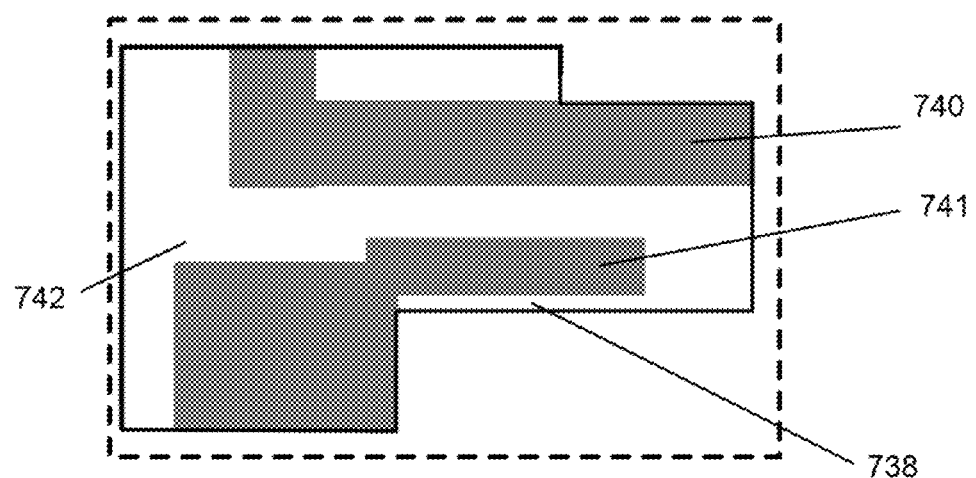

An example of an improved routing polygon abstract is shown in FIG. 7F. There, a level 700 comprises two routing polygon abstracts 740 and 741, and open space 742. In some embodiments, the EDA system 115 may further evaluate routing polygon abstracts 740 and 741 and route through the level by placing fills, connectors, or other objects in routable spaces such as through open space 742. Notable in FIG. 7F, the routing polygon abstract as shown in FIG. 7F allows an EDA system 115 to route though a relatively small open space 738 that lies between the routing polygon abstract 741 and an outer boundary 710. This would be useful, for example, if the object 707 (which contributed to 741) contained a component with pins that must be placed just outside object 707. However, while the routing polygon abstracts shown in FIG. 7F allow more detailed routing to occur, in more complex implementations, such as a design with thousands of objects per level, the routing polygon abstracts 741 and 742 might still be too large or computationally unwieldy for the EDA system 115 to manage efficiently. Alternatively, if none of the objects that contributed to 741 and 742 required external pins, again it may be undesirable to use routing polygon abstracts 741 and 742 if even more computationally efficient routing polygon model can be created.

Figure 8A:
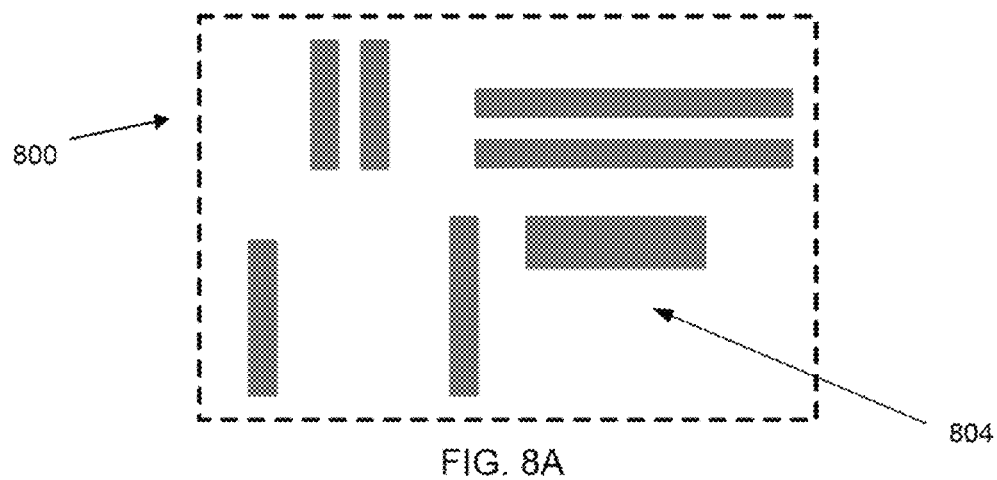
FIG. 8A-F illustrate example views of different stages of a method for creating maximum horizontal routing polygon abstracts.
Figure 8B:
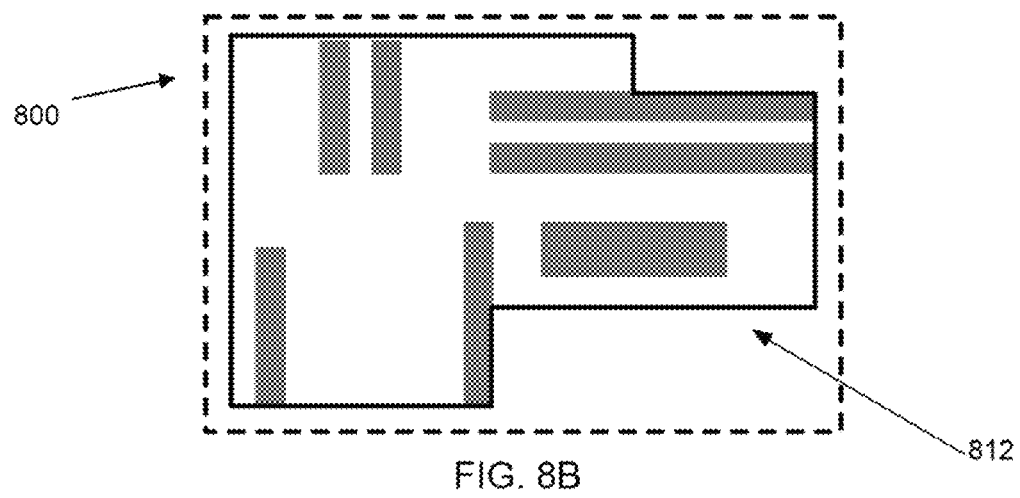
Figure 8C:
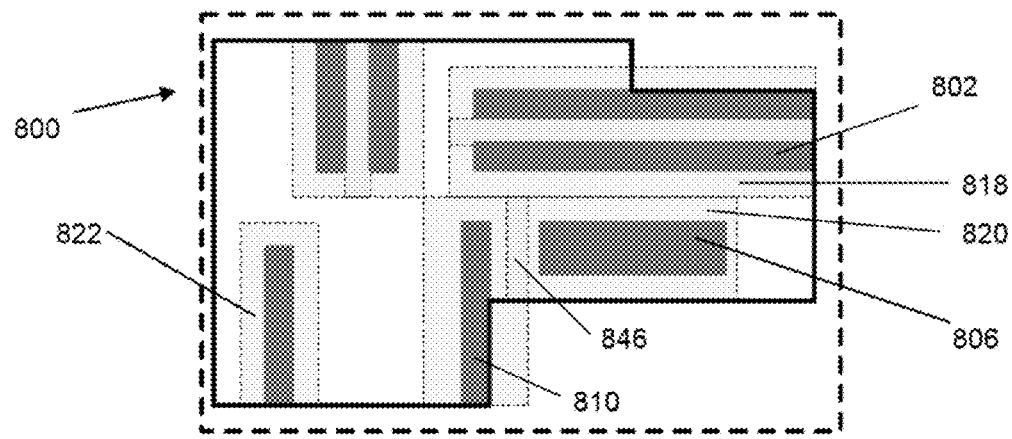
Figure 8D:
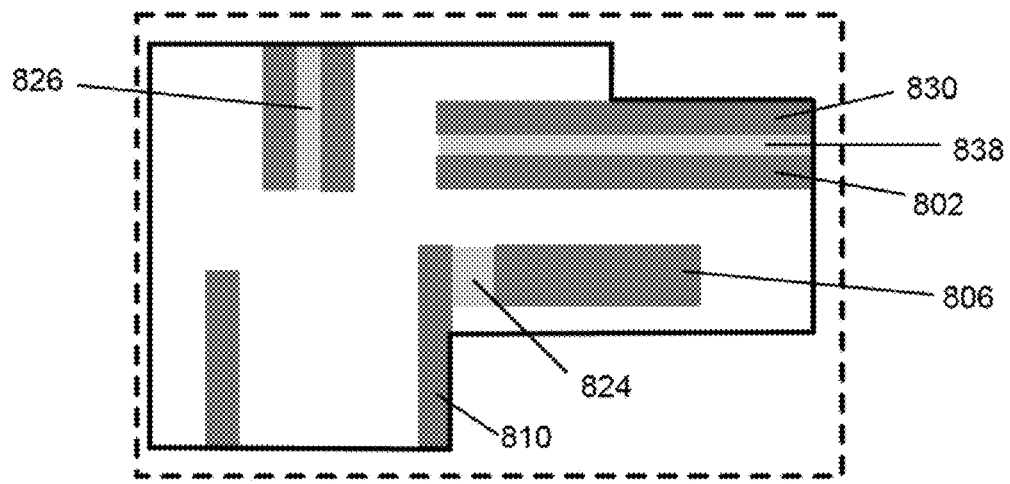
Figure 8E:
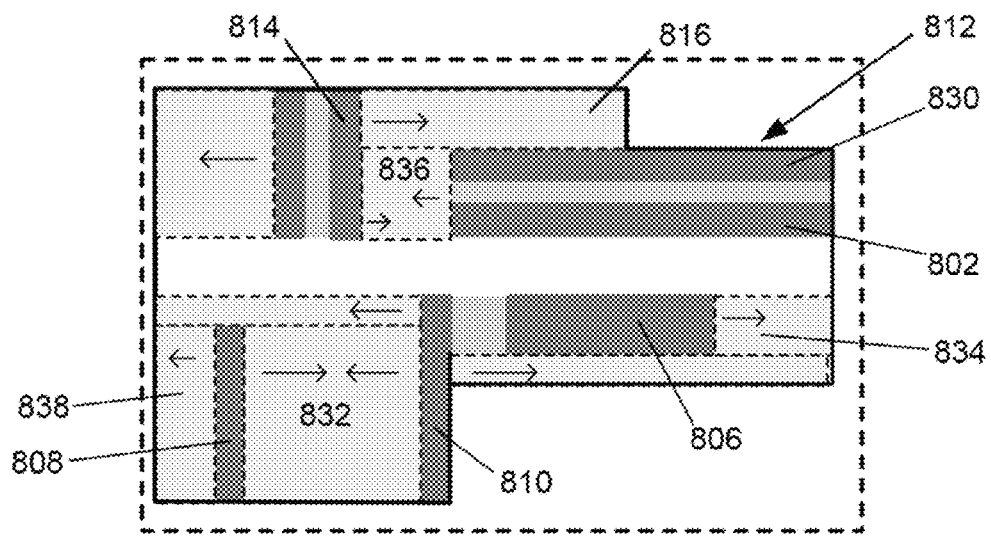
Figure 8F:
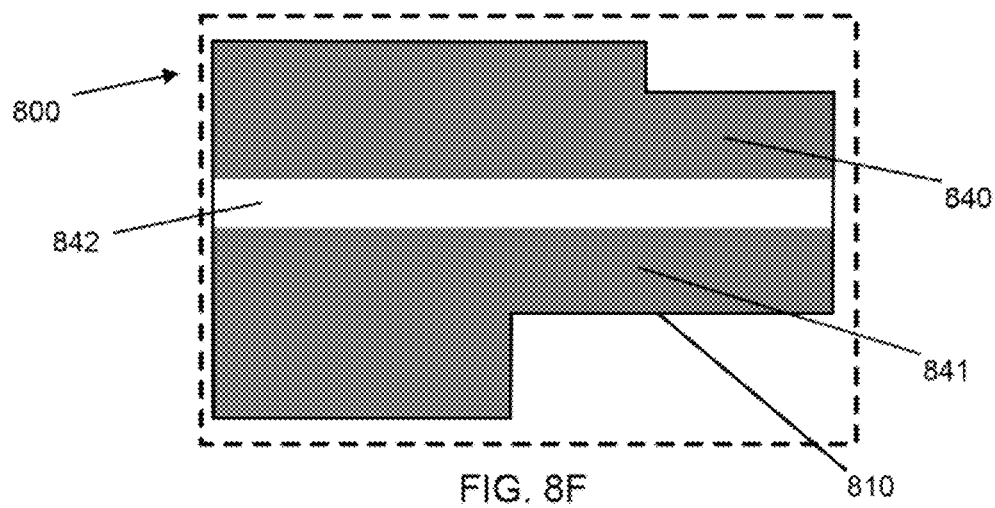

FIG. 8F shows examples of more efficient routing polygon abstracts, such as routing polygon models 840 and 841, which were made by extending the object boundaries to the outer boundary 810, as shown in FIG. 8A-E and discussed in detail below. In contrast to FIG. 7F, there is no longer space between the polygons and the outer boundary, such as open space 738. Although this approach may create more blockages than the polygons shown in FIG. 7F, the polygon's complexity has been greatly due to the fact that there are less details, less turns, and subsequently less data required to describe 840 and 841. Thus, an EDA system may more easily work with routing polygon abstracts 840 and 841 to find open space 842 through which to route and place objects, such as metal, fills, or wires.

Using these two example routing polygon abstracts, in addition to those discussed below, one of ordinary skill in the art may use an EDA system to efficiently customize the electrical design process. If the design includes objects with pins or other features that require a more detailed approach, the routing polygon abstract as shown in FIG. 7F or similar abstracts may be implemented. Whereas if the designer seeks to greatly reduce the complexity of a design, the routing polygon abstracts as shown in FIG. 8F may be implemented. In this way, a designer may use the improved routing polygon abstracts discussed below to fine-tune the routing process to adjust for design parameters and complexity.

Discussed below are example methods for creating the improved routing polygon abstracts.

Figure 2:
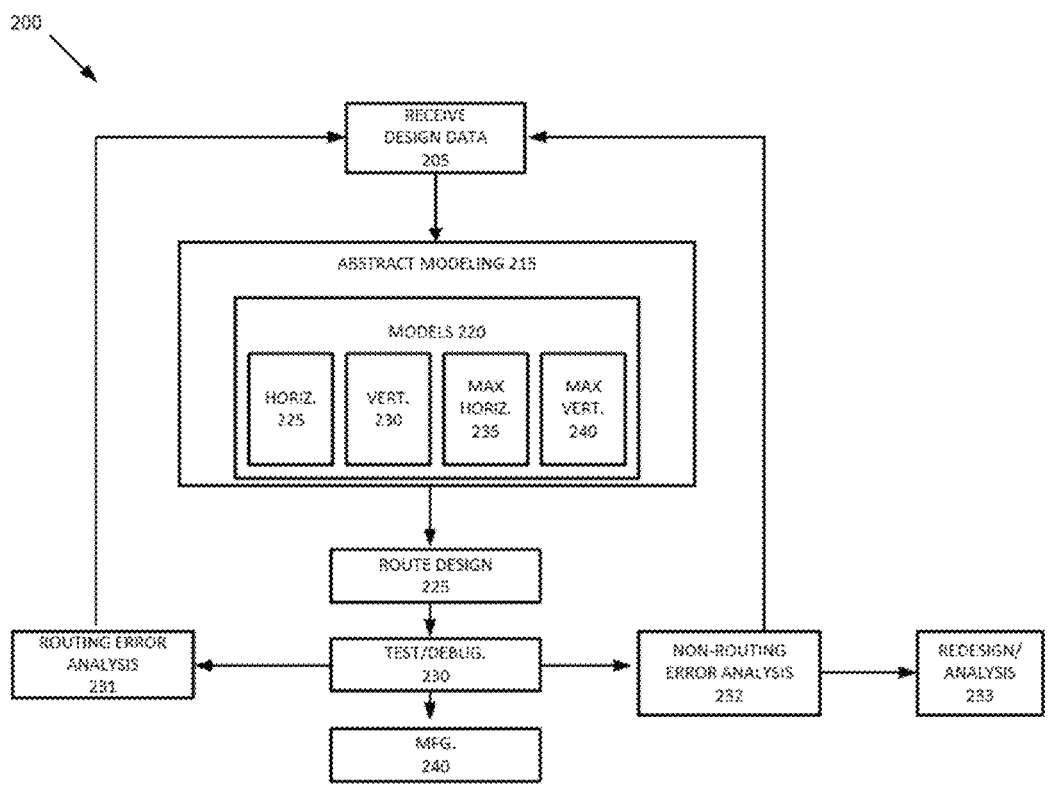
FIG. 2 illustrates a method for receiving design model data, abstracting improved routing polygons, and implementing testing and manufacturing.

FIG. 2 shows a high-level flow chart 200 of one version of a system to create routing polygon abstracts. Here, the process starts with the EDA system receiving design model data at 205. The design model data maybe previously manipulated from raw design data, and may correspond to physical object data, partially routed designs, fully routed designs, or otherwise. At 215, the EDA system routing tool begins abstracting the objects in a level. Various models 220 may be used to create routing polygon abstracts, such as a horizontal abstract model 225, a vertical abstract 230, a maximum horizontal abstract 235, and a maximum vertical abstract 240. Once the routing polygon abstracts have been created, the abstracts may be used for routing at step 225. At step 230, the routed designs are tested to debug the system of any errors. If routing errors are found, such as a misplaced route or inefficient routing result, the process may be further analyzed at 231 and returned to step 205 to repeat the process for the new debugged or potentially modified design. If non-routing errors are found, the process may be further analyzed at 232, and optionally sent for redesign and analysis 233. Assuming no errors are found and the routing results are sufficiently optimized, the process may continue to a manufacturing step at 240, where the electronic design is be implemented into a physical product.

Horizontal Abstracts

Figure 3:
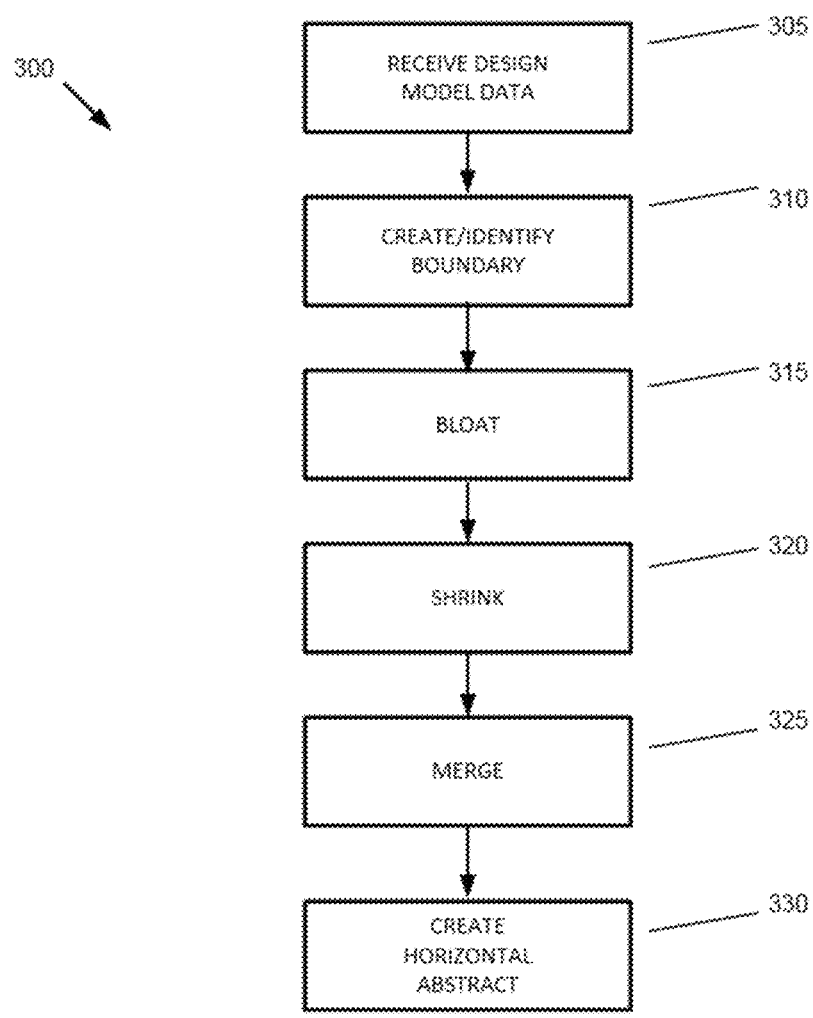
FIG. 3 illustrates a method for creating horizontal routing polygon abstracts.

To explain in greater detail, both FIG. 3, which shows steps of a method, and FIG. 7A-F, which shows designs, are referred to together. FIG. 3 shows an implementation of one version of a method 300 to create improved routing polygon abstracts. At step 305, design model data is received by the user or system for further analysis. An example of design model data that may be received is shown in FIG. 7A, as a level 700 upon which to design, such as a substrate, and objects 705 placed on the level. Although the illustrations depicted in FIG. 7A-F are floor placement designs, the design model data received at step 305 may also be prototyping data, partially routed design data, fully routed design data, routing optimization data, engineering change order (ECO) data, or data corresponding to physical electrical designs.

Further, the plurality of objects 705 may comprise, for example, circuit components, wires, interconnects, fills, components, and blockages, which are placed on the level 700 to create electrical designs. As placed, the objects 705 are shown at various parallel and perpendicular angles to one another, some aligned horizontally and some aligned vertically. One of ordinary skill in the art will appreciate that the systems and methods disclosed herein are not limited to a mix of parallel and perpendicular design placements, but also include "right way" and "wrong way" parallel routing and other variations. Generally, "right way" and "wrong way" is a methodology in which object placements are all made in the same parallel alignment direction per level. For example, one level might be designated a horizontally aligned level where all objects placed in the level must be placed parallel to each other in horizontal alignment. Another level might be designated as a vertically aligned level where all objects placed in the level must be placed in parallel to each other in vertical alignment. Thus, the alignments of the objects as show in FIG. 7A-F, are shown as examples of but one version of the system and method for creating improved routing polygon abstracts.

Once the design model data is received at 305 in FIG. 3, an outer boundary, such as a prBoundary, is identified at step 310 to contain or refer to the objects on the level. FIG. 7B shows the outer boundary 710 as a prBoundary which circumscribes all the objects and which can be used to refer to all objects on the level collectively as a block. Depending on project parameters, the outer boundary may be created in different ways. For example, the outer boundary may be strongly aligned with the objects contained within and thus a corner of the outer boundary and of an object may coincide, as shown at 711. Alternatively, the outer boundary may loosely be aligned with the objects contained, and thus a corner of the outer boundary may be created where there is no object corner, as shown at 712. The second case, where the outer boundary and the objects are loosely aligned and corners between them do not always coincide, may be due to objects in other levels 713 being taken into consideration when creating or identifying the outer boundary, or may be due to looser outer boundary design rules (for example, the corner at 712 may be created by "approximate fit" rules, instead of "exact fit" rules).

At step 315, the objects have their individual boundaries bloated to create a buffer space. FIG. 7C shows an example of object bloating. The bloating process may be the first step in the bloat-shrink process in which all the objects are first bloated to determine whether any object bloat spaces overlap, followed by a shrink stage where bloat spaces are shrunk to where they overlap.

FIG. 7C illustrates the bloating process. There, a first horizontal object 704, a second horizontal object 707 are bloated so that their extended boundaries create respective bloat spaces 715 and 716. In this example, if the bloat spaces 715 and 716 overlap, they create an area through which routing or placement should not occur. Thus, in FIG. 7C the first horizontal object's bloat space 715 and the second horizontal object's bloat space 716 do not overlap, thus the space may potentially be routed through, at least at this step. In contrast, the bloat spaces of object 709 and object 707 overlap at 725, thus those two objects may be too close to one another, and no routing should occur between them, as will be illustrated in a later shrink stage.

Another example is object 708 which has a bloat space 720 that is far from the other objects. Because the bloat space 720 does not overlap other spaces, object 708 has sufficient buffer space and will not be shrunk back towards other objects during the shrink stage.

At step 320, the objects and bloat space undergo shrinking. In FIG. 7D, the initial bloat spaces are shrunk back towards their respective objects, and only the areas in which the bloat spaces previously overlapped with other bloat spaces remain. For example looking at objects 731 and 704 which previously had bloat spaces that overlapped, after shrinking a space 730 remains that denotes a block off of routing between 731 and 704. Similarly, as previously explained, objects 709 and 707 had overlapping bloat spaces at 725, thus the result from the shrinking is space 725 through which no routing may occur.

At step 325, the objects are merged towards one another in a vertical direction. FIG. 7E illustrates the process of merging the objects towards one another in a horizontal direction. There, object 711, and objects 731 and 704 (which are here used as a group) are merged horizontally towards one another to create merge space 738. Similarly, for example, object 708 and 709, which had bloat spaces that did not overlap, are nonetheless merged towards one another horizontally in merge space 736.

After the objects have undergone bloating and shrinking, and have been merged towards one another horizontally, the collective data may be combined to create routing polygon abstracts at step 330, and as illustrated in FIG. 7F as 740 and 741. Although FIG. 7F illustrates an outer boundary as part of an output, one of ordinary skill in the art appreciates that some variations may include outputting the routing polygon abstracts without an accompanying outer boundary. Further, other sequences exist, such as merging the objects towards one another, as explained in step 325, directly without first creating an outer boundary.

Comparing FIG. 7A with FIG. 7F, one of ordinary skill in the art can appreciate that the number of objects and routable areas to be handled by the routing tool have been greatly reduced, which results in increased efficiency in the electrical design process. In particular, a system designer routing objects, who is forced to use the objects as placed in FIG. 7A, must track every individual object and must account for each object's required bloat, which creates a complex problem to process. However, looking at the result of the process 300, which is illustrated as FIG. 7F, one of ordinary skill in the art will appreciate that the number of objects to be tracked has been greatly reduced: there are two objects, 740 and 741, and a system designer can quickly find open space through which to route, such as open space 742. Though this example is greatly simplified for understanding, using a very small number of objects in a small simple level, one of ordinary skill in the art can appreciate that in large-scale designs where there may be thousands or millions of objects to be placed and routed around, the increase in efficiency is far greater.

Figure 4:
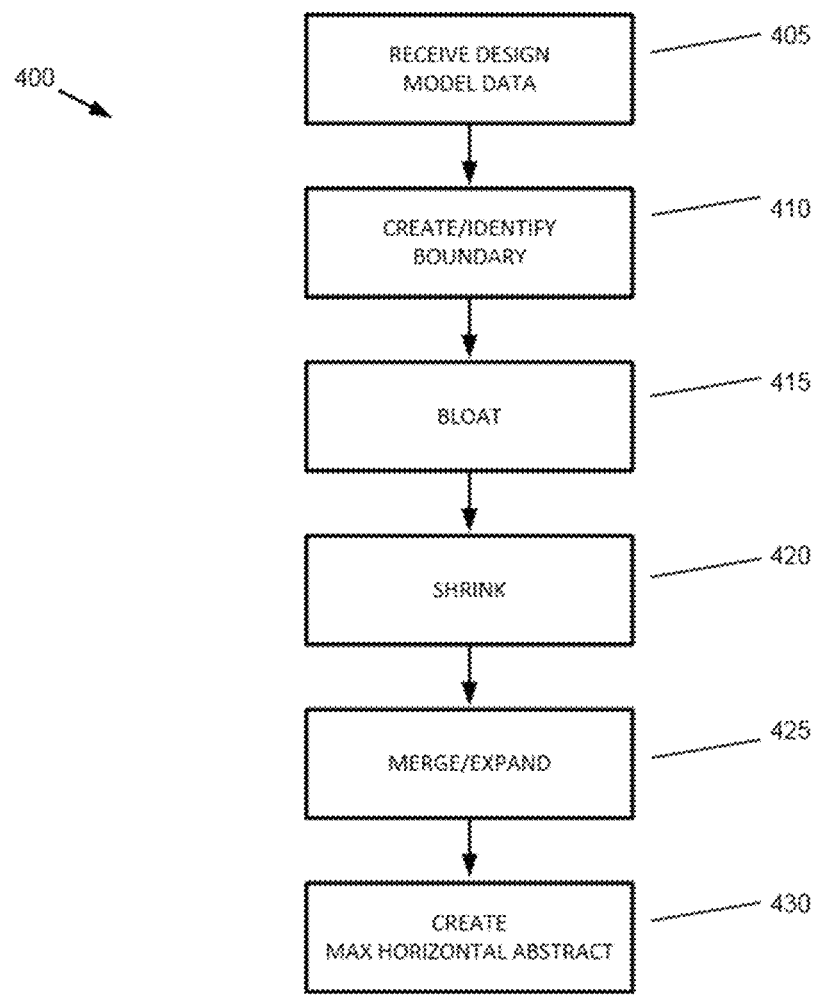
FIG. 4 illustrates a method for creating maximum horizontal routing polygon abstracts.

An alternative efficient routing polygon abstract may be created using a maximum horizontal merge process, as shown in FIG. 4. To explain in greater detail, FIG. 4, which shows steps in a process, and FIG. 8A-F, which show design levels, are referred to together. Several steps of FIG. 4 are the same as the steps in FIG. 3 but will be covered more briefly here. At step 405, design model data is received. FIG. 8A shows an example of design model data, comprising a level 800, and a plurality of objects on the level 804. At step 410, an outer boundary is created or identified. FIG. 8B illustrates this step and shows the outer boundary 812, as a prBoundary which collectively contains, blocks, or refers to the objects 804.

At step 415, the object boundaries are bloated to create buffer spaces. FIG. 8C illustrates this bloat space process. There, object 802 and object 806, and the respective bloat spaces 818 and 820, do not overlap, thus routing between them is not ruled out, at least at this step. In contrast, object 810 and object 806 have buffer spaces that overlap at 846, thus the overlapping area should be blocked off during the shrink stage.

At step 420, the objects and bloat spaces are shrunk back towards one another. FIG. 8D illustrates this process. There, object 830 and object 802 had bloat spaces that overlapped, thus when shrunk back a blocking space 838 remains. Similarly, object 810 and object 806 overlapped, thus when shrunk back, blocking space 824 remains.

At step 425, the objects are merged towards each other, and are extended towards the outer boundary. FIG. 8E shows both processes. First, the objects are merged towards each other in a horizontal direction, which is same process as shown in FIG. 3 as step 325. This horizontal merging process creates blocking space 832 and 836, which show arrows from the objects, merging towards each other.

Second, the object boundaries are extended towards the outer boundary 812. For example, object 814 is extended towards the outer boundary creating a blocking space 816. Additional examples include object 806 creating blocking space 834, and object 808 extending towards the outer boundary 812 to create space 838.

In FIG. 8E, additional merge areas are created between the objects and the outer boundary. For example, first, the object 808 was merged towards object 810, then second, the object 808 is extended towards the outer boundary in space 838. Similarly, object 806 is extended towards the outer boundary 812 in the space 834.

At step 430, the maximum horizontal routing polygon abstract is created from the collective objects, merge spaces created from bloat/shrinking, and blocking spaces created by merging the objects towards one another, and additional spaces created by extending the objects toward the outer boundary 812. FIG. 8F illustrates the result of this process. There, the collective shapes are combined to create routing polygon abstract shapes 840 and 841 which extend from one side of the outer boundary 812 to the other side of the outer boundary 812. This alternative routing polygon abstract creates an even greater reduction in complexity and increase in efficiency. One of ordinary skill in the art can use can use the maximum horizontal routing polygon abstracts 840 and 841 to more easily find a clear horizontal path 842 through which to route.

Vertical Abstracts

Figure 5:
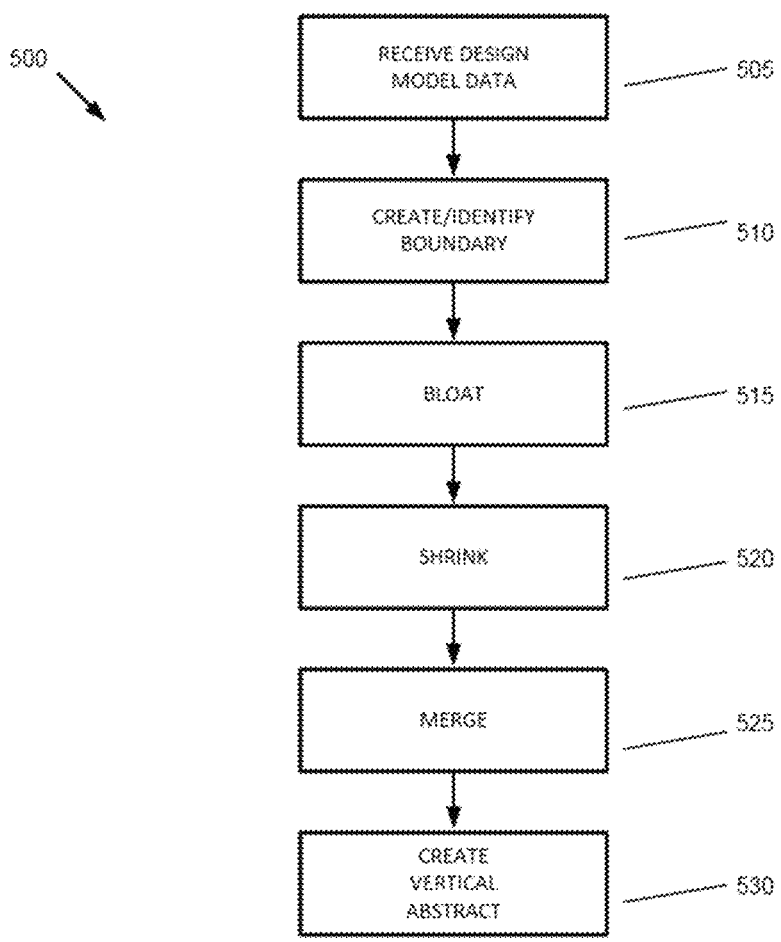
FIG. 5 illustrates a method for creating vertical routing polygon abstracts.
Figure 9A:
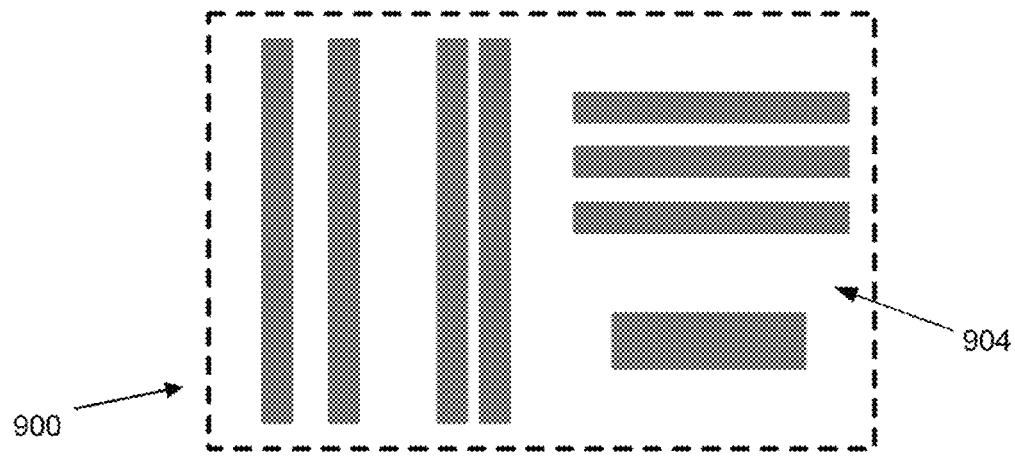
FIG. 9A-F illustrate example views of different stages of a method for creating vertical routing polygon abstracts.

Additional routing polygon abstracts may be created that allow one to find routes vertically through a design more efficiently. To explain in greater detail, both FIG. 5, which shows steps of a method, and FIG. 9A-F, which show designs, are referred to together. FIG. 5 shows an implementation of one version of a method 500 to create improved routing polygon abstracts. At step 505, design model data is received for further analysis. An example of design model data that may be received is shown in FIG. 9A, as a level 900 upon which to design, such as a substrate, and objects 904 placed on the level. Although the illustrations depicted in FIG. 9A-F are floor placement designs, the design model data received at step 505 may also be prototyping data, partially routed design data, fully routed design data, routing optimization data, engineering change order (ECO) data, or data corresponding to physical electrical designs. Further, the plurality of objects 904 may include, for example, circuit components, wires, interconnects, fills, components, and blockages, that are placed on the level 900 to create electrical designs.

Figure 9B:
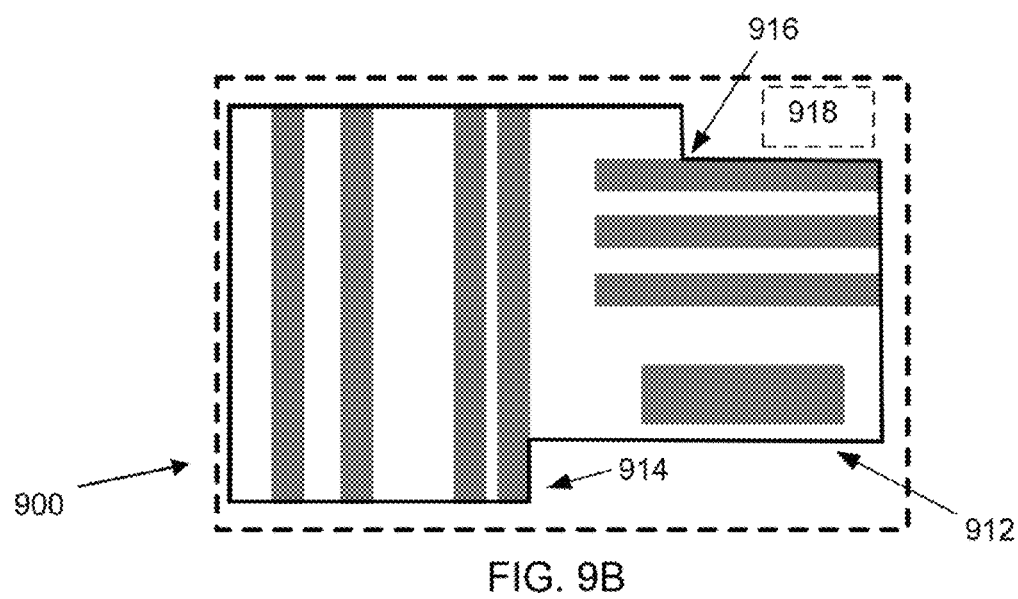

Once the design model data is received at 505 in FIG. 5, an outer boundary, such as a prBoundary, is identified at step 510 to contain or reference all the objects on the level. FIG. 9B shows the outer boundary 912, as a prBoundary which can be used to refer to all objects on the level collectively as a block. Depending on project parameters, the outer boundary may be created in different ways. For example, the outer boundary may be strongly aligned with the objects contained within, and thus a corner of the outer boundary and of an object may coincide, as shown at 914. Alternatively, the outer boundary may loosely be aligned with the objects contained, and thus a corner of the outer boundary may be created where there is no object corner, as shown at 916. The second case, where the outer boundary and the objects are loosely aligned and corners between them do not always coincide, may be due to objects in other levels 918 being taken into consideration when creating or identifying the outer boundary, or may also be due to looser outer boundary design rules (for example, the corner at 916 may be created by "approximate fit" rules, instead of "exact fit" rules).

Figure 9C:
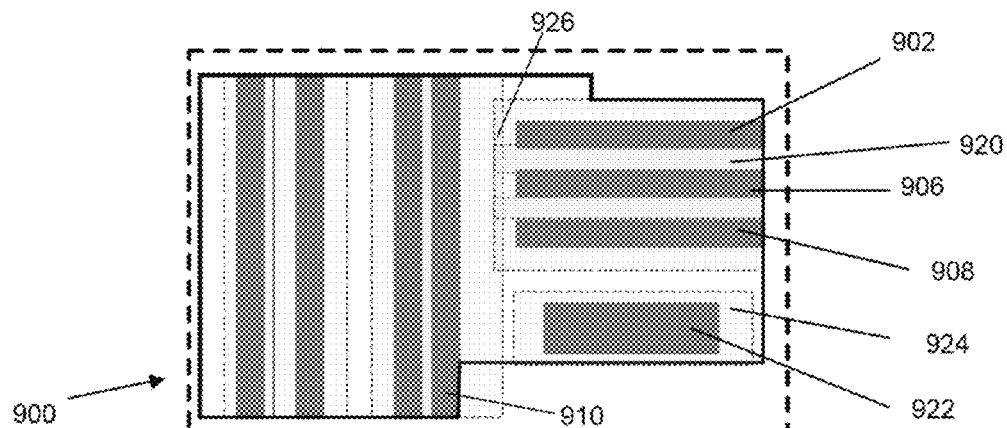

At step 515, the object's individual boundaries are bloated to create buffer spaces. FIG. 9C shows an example of object bloating. The bloating process may be the first step in the bloat-shrink process in which all the objects are first bloated to determine whether any object bloat spaces overlap, followed by a shrink stage which blocks off the area where bloat spaces previously overlapped.

FIG. 9C illustrates the bloating process. There, a first horizontal object 902 and a second horizontal object 906 are bloated, and their extended bloat boundaries overlap at 920. Further, the objects 902, 906, and 908 collectively overlap the bloat space of object 910 at 926. In contrast, it is noted that nothing overlaps bloat space 924, which emanates from object 922.

Figure 9D:
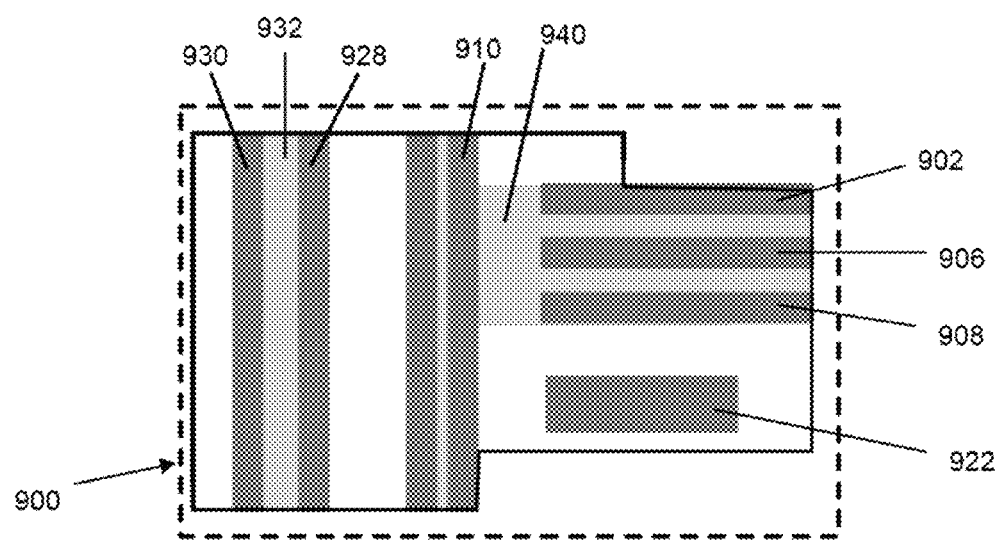

At step 520, the objects and bloat spaces undergo shrinking. In FIG. 9D, the initial bloat spaces are shrunk back towards their respective objects, and only the areas in which the bloat spaces previously overlapped. For example, object 930 and object 928 had previously overlapping bloat spaces, thus after shrinking a blocking space 932 remains. Similarly, the bloat spaces of 902, 906, and 908 overlapped with the bloat space of 910 and with each other, thus after shrinking blocking space 940 remains. Further, as previously noted, nothing overlapped the bloat space of object 922, thus after shrinking, object 922 remains free from the other objects.

Figure 9E:
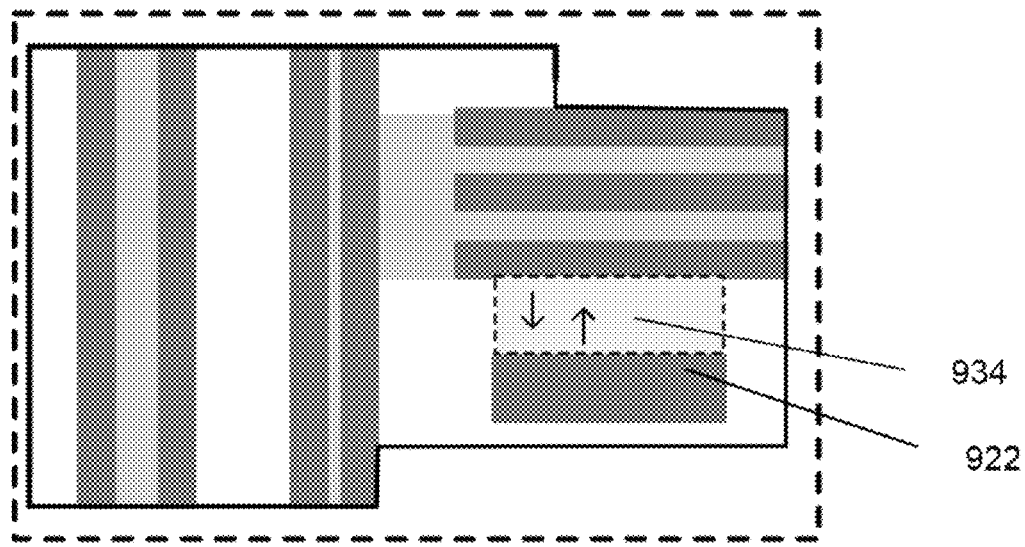

At step 525, the objects are merged in a vertical direction towards one another. FIG. 9E illustrates the process of merging the objects towards one another in a vertical direction. As explained, the bloat space of object 922 did not overlap other bloat spaces so it remained free with no surrounding or connecting blocking spaces. Nonetheless, after merging vertically, object 922 is merged towards the above object group to create merge space 934.

Figure 9F:
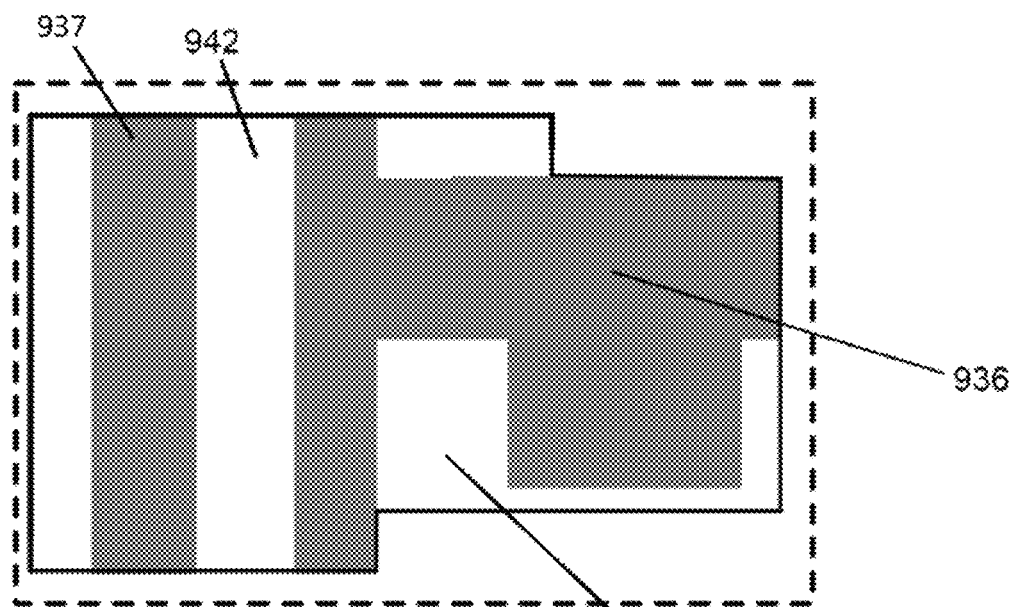

At step 530, the vertical abstract is created from the collective objects including the objects themselves, the blocking spaces created by the bloat shrink process, and the merge spaces created by merging in the vertical. FIG. 9F illustrates the resulting vertical routing polygon abstracts. There, the previous shapes were combined to create the routing polygon abstracts 936 and 937. Comparing FIG. 9A with FIG. 9F, one of ordinary skill in the art can appreciate that the number of objects and routable areas to be handled by the routing tool is greatly reduced, which results in increased efficiency in the electrical design process.

In particular, a system designer forced to route using the placement as shown in FIG. 9A must track every individual object and must account for each object's required bloat, and other data. Though this example is greatly simplified using a very small number of objects in one level, a person of ordinary skill in the art can appreciate that in large-scale designs where there may be thousands or millions of objects to be placed and routed around, the increase in efficiency is far greater.

Figure 6:
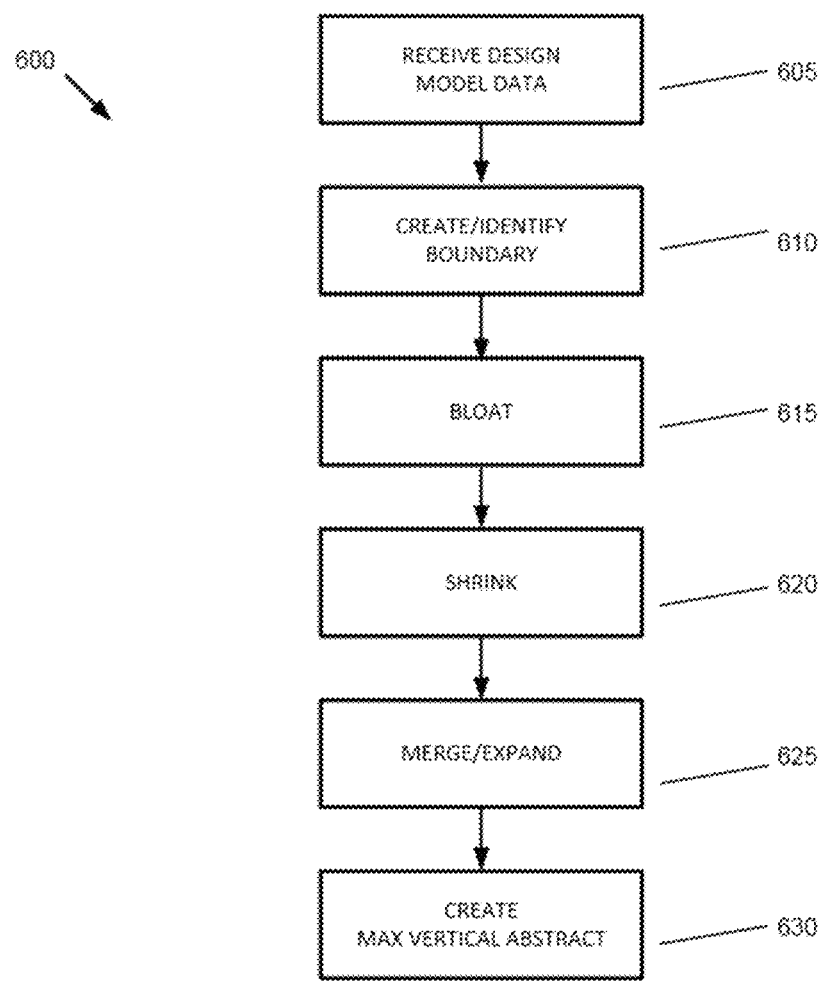
FIG. 6 illustrates a method for creating maximum vertical routing polygon abstracts.
Figure 10A:
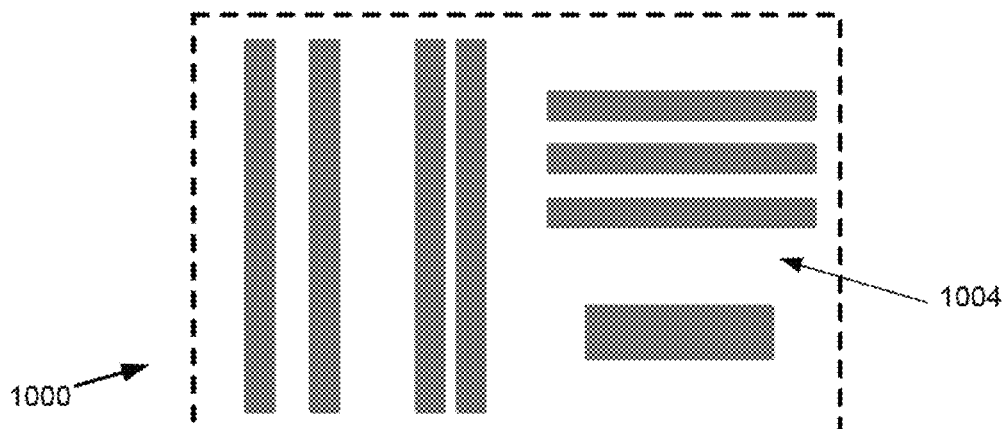
FIG. 10A-F illustrate example views of different stages of a method for creating maximum vertical routing polygon abstracts.
Figure 10B:
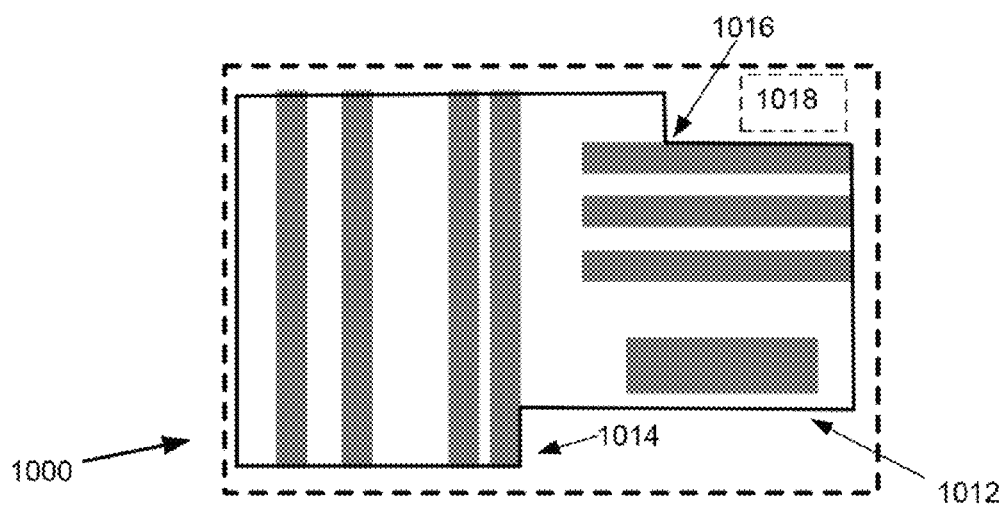

An alternative efficient routing polygon abstract may be created using a maximum vertical merge process, as shown in FIG. 6. To explain in further detail FIG. 6, which shows steps in a process, and FIG. 10A-F, which shows design levels, are referred to together. Several steps of FIG. 6 are the same the steps in FIG. 5 but will be covered more briefly here. At step 605 design model data is received. FIG. 10A shows an example of design model data, comprising a level 1000, and a plurality of objects on the level 1004. At step 610, an outer boundary is created or identified. FIG. 10B illustrates this step and shows the outer boundary 1012, as a prBoundary which collectively contains all the objects 1004.

At step 615, each object's boundary is bloated to create respective buffer spaces. The bloating process may be the first step of the bloat-shrink process in which all the objects are first bloated to determine whether any object bloat spaces overlap, followed by a shrink stage which blocks off the area where any bloat spaces previously overlapped.

Figure 10C:
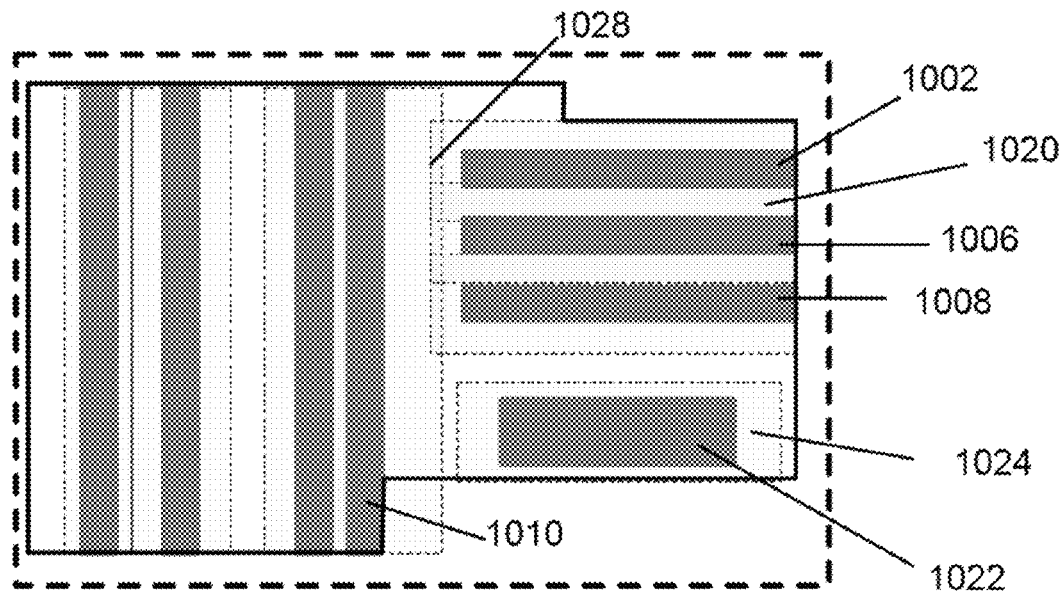

FIG. 10C illustrates the bloating process. There, a first horizontal object 1002, and a second horizontal object 1006 are bloated, and their extended bloat boundaries overlap at 1020. Further, the objects 1002, 1006, and 1008 collectively overlap the bloat space of object 1010 at 1028. In contrast, it is noted that there is no overlap of bloat space 1024, which emanates from object 1022.

Figure 10D:
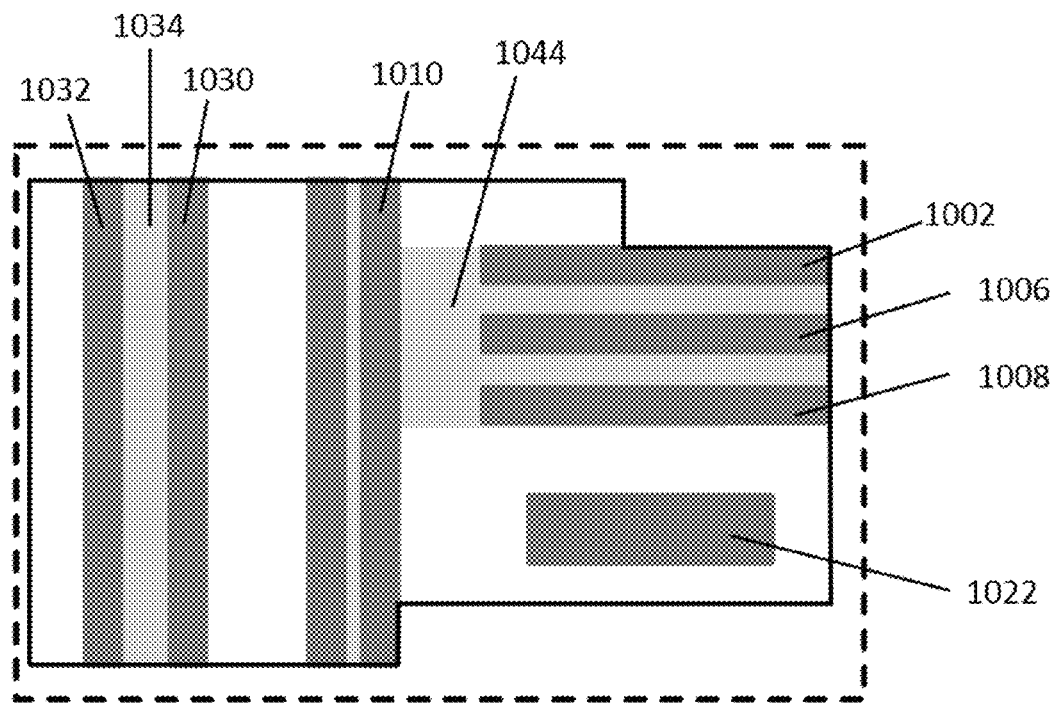

At step 620, the objects and bloat spaces undergo shrinking. In FIG. 10D, the initial bloat spaces are shrunk back towards their respective objects, and only the areas in which the bloat spaces previously overlapped with other bloat spaces remain. For example, object 1032 and object 1030 had previously overlapping bloat spaces, thus after shrinking a blocking space 1034 remains. Similarly, the bloat spaces of 1002, 1006, and 1008 overlapped with the bloat space of 1010 and with each other, thus after shrinking, blocking space 1044 remains. Further, as previously noted, nothing overlapped the bloat space of object 1022, thus after shrinking, object 1022 remains free from the other objects.

Figure 10E:
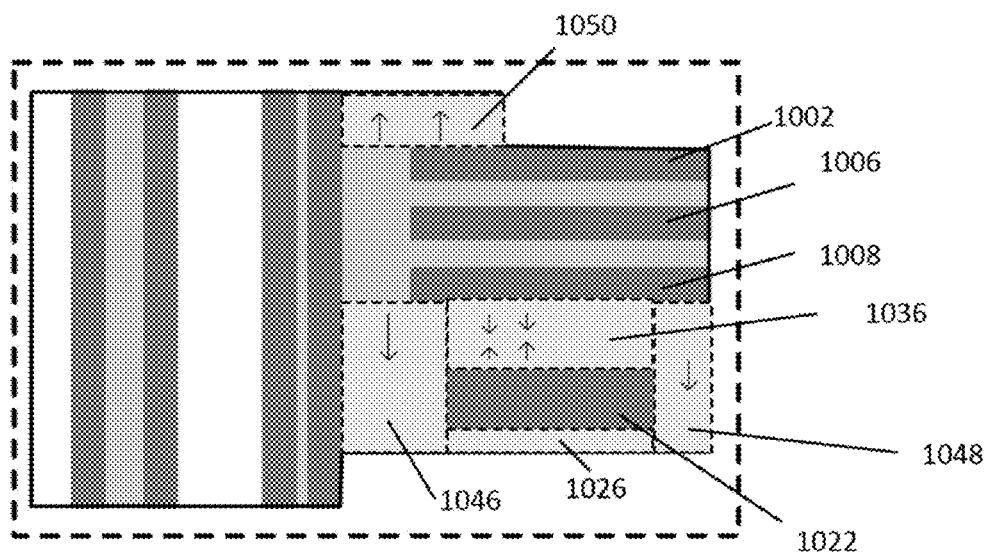

At step 625, the objects are merged towards each other, and are also extended towards the outer boundary. FIG. 10E shows both processes. Though here, the merge/extend is shown as one step in FIG. 6, one of ordinary skill in the art can appreciate that it may entail two steps, and variations thereof.

First, the objects are merged towards each other in a vertical direction, which is the same process as shown in FIG. 5 as step 525. This vertical merging process creates the blocking process 1036, which is denoted by two sets of arrows pointing the opposite directions.

Second, the object boundaries are extended towards the outer boundary 1012. For example, the object grouping of 1002, 1006, 1008 and their respective bloat spaces are extended upward and downward towards the outer boundary 1012, to create spaces 1050, 1046, and 1048. Similarly, object 1022 is extended downwards toward the outer boundary 1012 to create space 1026. There is no need to extend object 1022 upwards, since that space was already created during the vertical merging process. However, as explained above, the merge/extend method is exemplary, and variations exist combining the steps above in different ways.

Figure 10F:
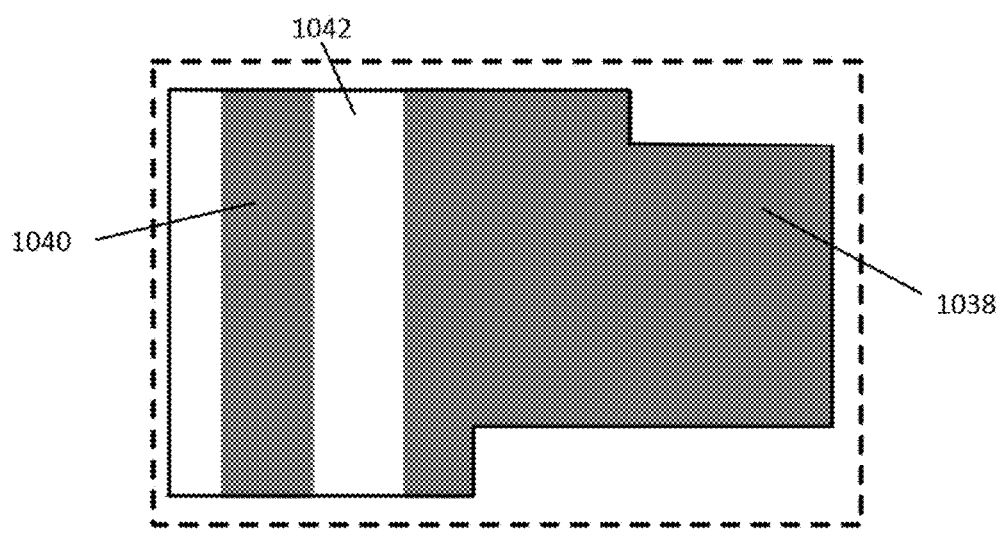

At step 630, the maximum vertical routing polygon abstract is created from the collective objects, merge spaces created from bloating and shrinking, blocking spaces created by merging the objects towards one another, and additional merge spaces created by extending the objects towards the outer boundary. FIG. 10F illustrates the result of this process. There, the collective shapes are combined to create routing polygon abstract 1038 and 1040. This alternative result of merging to the outer boundary creates an even greater reduction in routing complexity and increase in efficiency, as one of ordinary skill in the art can use the maximum vertical routing polygon abstracts 1038 and 1040 to readily find a clear vertical path 1042 through which to route.

The systems and methods disclosed herein to create routing polygon abstracts for each level applies equally well to multilevel designs. For example, if a multilevel design consisted of a first level, such as the one shown in FIG. 8A, and a second level, such as the one shown in FIG. 10A, that are stacked on one another, one of ordinary skill in the art could arrive at results illustrated in FIG. 8F that shows a max horizontal routing polygon abstract and the results illustrated in FIG. 10F that shows a maximum vertical routing polygon abstract, using the methods described above for each level. Thus, using the two results, one could combine to them to create a single multi-level routing polygon abstract that takes into account both horizontal and vertical merging processes. A path through this multi-level routing polygon abstract in this example, would be given by the intersection of routable spaces 842 of FIG. 8F and 1042 of FIG. 10F. Other variations include outputting or generating one or more routing polygon abstracts, as exemplified by 1038 and 1040 in FIG. 10F, and then referencing them as the same data set, thereby allowing them to act as one shape, though they are not directly connected.

Thus, by implementing the routing polygon abstract systems and methods disclosed above, such as vertical, horizontal, maximum vertical, maximum horizontal, combining output abstracts, and defining multi-level abstracts, routing through complex designs is greatly simplified. Instead of tracking thousands or millions of objects, a comparatively small number of improved routing polygon abstracts can be used instead, thereby vastly increasing an EDA system's efficiency and reducing the computational workload.

System Architecture Overview

Figure 11:
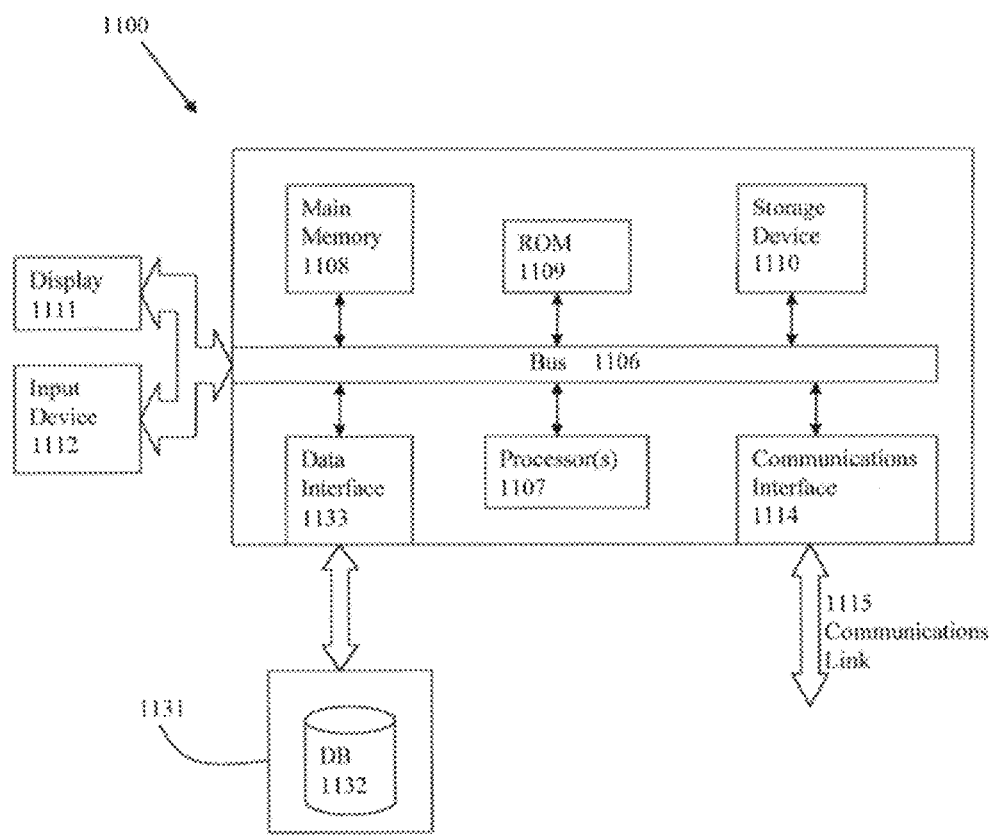
FIG. 11 illustrates an example system architecture overview.

FIG. 11 is a block diagram of an illustrative computing system 1100 suitable for implementing an embodiment of the present invention. Computer system 1100 includes a bus 1106 or other communication mechanism for communicating information, which interconnects subsystems and devices, such as processor 1107, system memory 1108 (e.g., RAM), static storage device 1109 (e.g., ROM), disk drive 1110 (e.g., magnetic or optical), communication interface 1114 (e.g., modem or Ethernet card), display 1111 (e.g., CRT or LCD), input device 1112 (e.g., keyboard), and cursor control.

According to one embodiment of the invention, computer system 1100 performs specific operations by processor 1107 executing one or more sequences of one or more instructions contained in system memory 1108. Such instructions may be read into system memory 1108 from another computer readable/usable medium, such as static storage device 1109 or disk drive 1110. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1107 for execution. Such a medium may take many forms, including but not limited to, non-volatile media and volatile media. Non-volatile media includes, for example, optical or magnetic disks, such as disk drive 1110. Volatile media includes dynamic memory, such as system memory 1108.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1100. According to other embodiments of the invention, two or more computer systems 1100 coupled by communication link 1115 (e.g., LAN, PTSN, or wireless network) may perform the sequence of instructions required to practice the invention in coordination with one another.

Computer system 1100 may transmit and receive messages, data, and instructions, including program, i.e., application code, through communication link 1115 and communication interface 1114. Received program code may be executed by processor 1107 as it is received, and/or stored in disk drive 1110, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed:

1. A computer-implemented method for using a processor to create routing polygon abstract data, comprising:
   executing a modeling module that is stored at least partially in memory and functioning in conjunction with at least one computer processor, the modeling module configured to perform at least:
   identifying an outer boundary encompassing a plurality of objects in a design model data set of an electronic design;
   generating bloated areas at least by bloating object boundaries of the plurality of objects;
   identifying one or more blocked areas where no routing is permitted at least by shrinking one or more bloated boundary segments of the bloated boundaries to one or more corresponding boundary segments of the object boundaries;
   creating at least one merged area at least by merging at least first and second object boundaries of a first object and a second object of the plurality of objects towards each other;
   generating routing polygon abstract data based at least in part upon one or more identified blocked areas and the at least one merged area that has been created; and
   readying the electronic design for manufacturing at least by simplifying design data for the electronic design with the routing polygon abstract data that has been generated.

2. The method of claim 1 wherein the at least first and second object boundaries are merged in a vertical direction.

3. The method of claim 2, further comprising:
   extending at least some of the object boundaries towards the outer boundary in the vertical direction.

4. The method of claim 1 wherein the at least first and second object boundaries are merged in a horizontal direction.

5. The method of claim 4, further comprising:
   extending at least some of the object boundaries towards the outer boundary in the horizontal direction.

6. The method of claim 1 wherein the outer boundary circumscribes the plurality of objects within the design model data set.

7. The method of claim 1 wherein the design model data set comprises multiple levels of design model data.

8. The method of claim 7 wherein the routing polygon abstract data corresponds to all objects in the multiple levels.

9. A system for creating routing polygon abstract data, comprising:
   a processor;

a non-transitory storing thereupon a sequence of instructions;

a modeling module stored at least partially in memory and functioning in conjunction with the processor to execute the sequence of instructions to:

execute the modeling module the modeling module that is stored at least partially in memory and functioning in conjunction with at least one computer processor and is configured at least to:

identify outer boundary encompassing a plurality of objects in a design model data set of an electronic design;

generate bloated boundaries at least by bloating object boundaries of the plurality of objects;

identify one or more blocked areas where no routing is permitted at least by shrinking one or more bloated boundary segments of the bloated boundaries to one or more corresponding boundary segments of the object boundaries;

creating at least one merged area at least by merging at least first and second object boundaries of a first object and a second object of the plurality of objects towards each other;

generating routing polygon abstract data based at least in part upon one or more identified blocked areas and the at least one merged area that has been created; and readying the electronic design for manufacturing at least by simplifying design data for the electronic design with the routing polygon abstract data that has been generated.

10. The system of claim 9 wherein the at least first and second object boundaries are merged in a vertical direction.

11. The system of claim 10, further comprising:
extending at least some of the object boundaries towards the outer boundary in the vertical direction.

12. The system of claim 9 wherein the at least some of object boundaries are merged in a horizontal direction.

13. The system of claim 12, further comprising:
extending at least some of the object boundaries towards the outer boundary in the horizontal direction.

14. The system of claim 9 wherein the design model data set comprises multiple levels of design model data, and the routing polygon abstract data corresponds to all objects in multiple levels.

15. A computer program product embodied on a non-transitory computer usable medium, the non-transitory computer usable medium having stored thereon a sequence of instructions which, when executed by a processor causes the processor to execute a set of acts for accessing stream data corresponding to an electronic design, the set of acts comprising:

executing a modeling module that is stored at least partially in memory and functioning in conjunction with at least one computer processor, the modeling module configured to perform at least:

identifying an outer boundary encompassing a plurality of objects in a design model data set of an electronic design;

generating, at a modeling module stored at least partially in memory and functioning in conjunction with at least one computer processor, bloated areas at least by bloating object boundaries of the plurality of objects;

identifying one or more blocked areas where no routing is permitted at least by shrinking one or more bloated boundary segments of the bloated boundaries to one or more corresponding boundary segments of the object boundaries;

creating at least one merged area at least by merging at least first and second object boundaries of a first object and a second object of the plurality of objects towards each other;

generating routing polygon abstract data based at least in part upon one or more identified blocked areas and the at least one merged area that has been created; and readying design for manufacturing at least by simplifying design data for the electronic design with the routing polygon abstract data that has been generated.

16. The computer program product of claim 15, wherein the at least first and second object boundaries are merged in a vertical direction.

17. The computer program product of claim 16, the set of acts further comprising:
extending at least some of the object boundaries towards the outer boundary in the vertical direction.

18. The computer program product of claim 15, wherein the at least first and second object boundaries are merged in a horizontal direction.

19. The computer program product of claim 18, the set of acts further comprising:
extending at least some of the object boundaries towards the outer boundary in the horizontal direction.

20. The computer program product of claim 18, the set of acts further comprising:
creating a corner in the outer boundary at least by strongly or loosely aligning the outer boundary with the plurality of objects.

* * * * *